United States Patent
Koohgoli et al.

[19]

[11] Patent Number: 6,091,968
[45] Date of Patent: *Jul. 18, 2000

[54] CALL SWITCHING SYSTEM BASED ON TYPE OF CALL

[75] Inventors: Mahshad Koohgoli; Howard Martin Sandler, both of Ottawa, Canada

[73] Assignee: Nortel Networks Corporation, Montreal, Canada

[*] Notice: This patent issued on a continued prosecution application filed under 37 CFR 1.53(d), and is subject to the twenty year patent term provisions of 35 U.S.C. 154(a)(2).

[21] Appl. No.: 08/873,930

[22] Filed: Jun. 12, 1997

[51] Int. Cl.⁷ ........................................................ H04Q 7/20
[52] U.S. Cl. ............................ 455/557; 455/414; 455/555
[58] Field of Search ..................... 455/553, 555, 455/557, 461, 424, 425, 428, 413, 414, 415, 554, 556, 552; 379/67.1, 88.22, 88.23, 88.24, 88.27, 100.15, 100.16, 93.09, 93.11, 373

[56] References Cited

U.S. PATENT DOCUMENTS

| | | | |
|---|---|---|---|
| 4,658,096 | 4/1987 | West, Jr. et al. | 455/74.1 |
| 4,837,797 | 6/1989 | Freeny, Jr. | 379/67 |
| 5,036,534 | 7/1991 | Gural | 379/93.09 |
| 5,164,982 | 11/1992 | Davis | 379/93.09 |
| 5,185,783 | 2/1993 | Takahashi et al. | 379/93.09 |
| 5,257,290 | 10/1993 | Hill et al. | 455/41 |
| 5,339,354 | 8/1994 | Becker et al. | 379/77 |
| 5,341,418 | 8/1994 | Yoshida | 379/399 |
| 5,432,844 | 7/1995 | Core et al. | 379/77 |
| 5,481,605 | 1/1996 | Sakurai et al. | 379/243 |
| 5,559,860 | 9/1996 | Mizikovsky | 455/414 |
| 5,568,536 | 10/1996 | Tiller et al. | 379/58 |
| 5,602,846 | 2/1997 | Holmquist et al. | 370/384 |
| 5,623,537 | 4/1997 | Ensor et al. | 379/67.1 |
| 5,774,791 | 6/1998 | Strohallen et al. | 455/41 |
| 5,946,616 | 8/1999 | Schornack et al. | 455/422 |
| 5,953,407 | 9/1999 | Zhang et al. | 455/414 |

*Primary Examiner*—William G. Trost
*Assistant Examiner*—Jean A. Gelin

[57] ABSTRACT

In a multi-service wireless, or wired, integrated services digital network having an analog loop driven by an analog loop adapter, the type-of-call information (i.e., voice, data, or fax) in a call setup message is used at the analog loop adapter to generate a call-type signal. A switch is interposed between the analog loop and each piece of terminal equipment on the loop. Each switch responds to the call-type signal lo adjust the switch setting so that terminal equipment attached to the switch which does not match the call-type does not receive the ensuing ringing signal.

26 Claims, 4 Drawing Sheets

CALL SWITCHING SYSTEM BASED ON TYPE OF CALL

FIELD OF THE INVENTION

This invention relates to a communication system and to a method for use in a communication system having an analog loop with a loop driver.

DESCRIPTION OF THE RELATED ART

Figure 2:
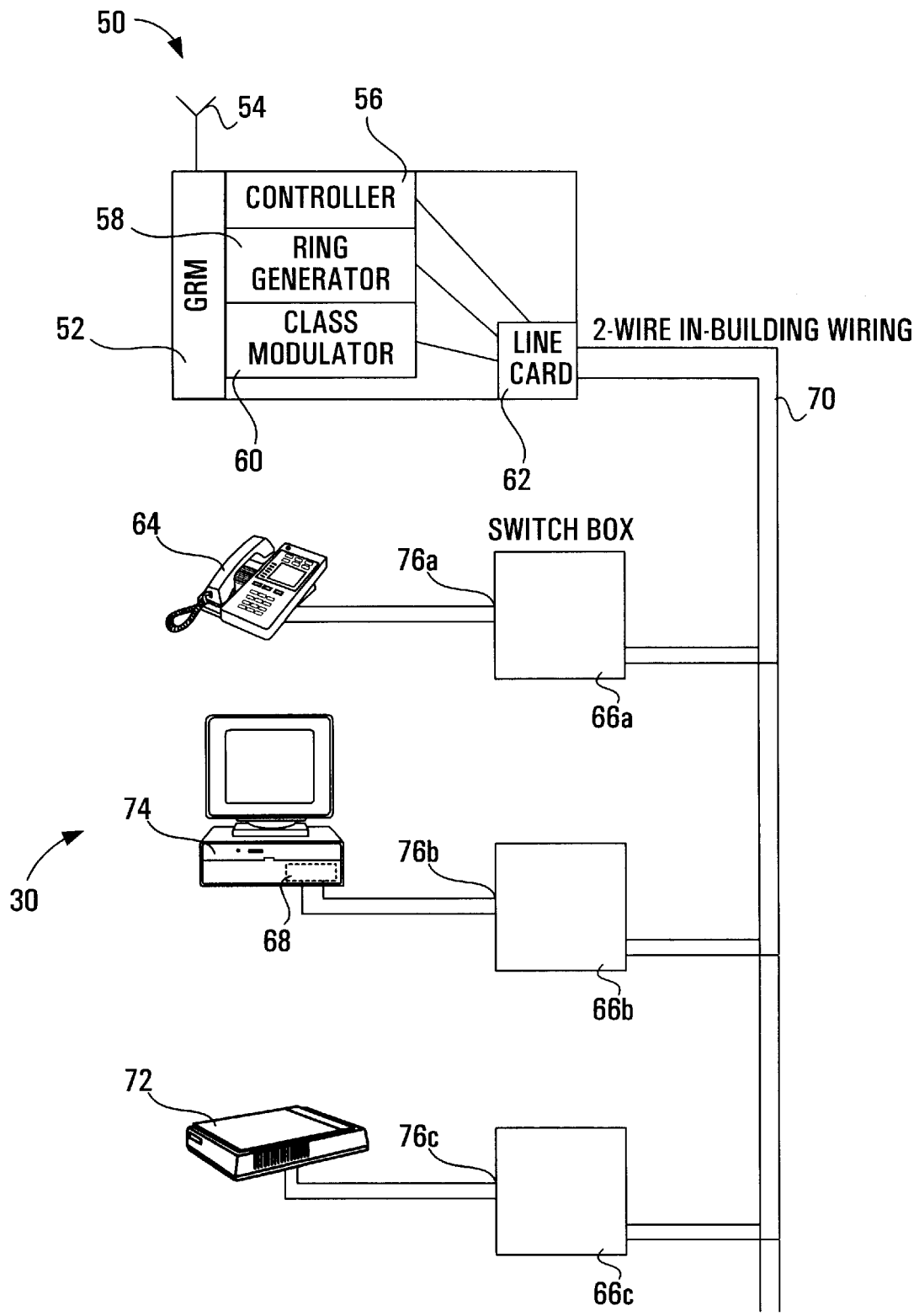

In the public switched telephone network (PSTN), two or more destination numbers (DNs) may be assigned to one subscriber line and a distinctive ring allotted to each such DN. With this arrangement, one of these DNs could be considered a fax number and the other DN could be considered a voice number. A smart switching device connected to the subscriber line at the subscriber premises could recognize a distinctive ring and route the call accordingly to either voice terminal equipment (i.e., a telephone) or fax terminal equipment connected to the switch. The problem with this arrangement is that it requires separate pairs of wires from the switch to each terminal. This is not compatible with normal in-building residential wiring plans where all terminals share the same pair of wires (i.e., an analog loop).

Further, this system, while functional for the PSTN, is not applicable for a multi-service wireless system, such as the global system for mobile communications (GSM) where signalling to subscriber stations is conveyed out-of-band.

SUMMARY OF THE INVENTION

According to the present invention, there is provided a communications system, comprising: an analog loop; a loop driver for driving said analog loop, said loop driver for receiving an incoming call including an indication indicating whether said incoming call is a voice call or a non-voice call, constructing a call-type signal based on said indication, transmitting said call-type signal on said analog loop and, thereafter, placing a ringing signal on said analog loop; at least one switch connected to said analog loop, said at least one switch having a port for connection to a type of terminal equipment, said type of terminal equipment comprising voice call terminal equipment or non-voice call terminal equipment, said switch for receiving the call-type signal on said analog loop and for disconnecting said port from said loop if said call-type signal indicates a type of call not compatible with said type of terminal equipment.

According to another aspect of the invention, there is provided a method for use in a communication system having an analog loop driven by a loop driver, comprising: receiving at said loop driver an incoming call including an indication indicating whether said incoming call is a voice call or a non-voice call; based on said indication, transmitting a call-type signal on said analog loop; responsive to said call-type signal, disconnecting any port from said analog loop which is not intended for attachment with terminal equipment compatible with a call-type indicated by said call-type signal; and placing a ringing signal on said analog loop.

According to a further aspect of the invention, there is provided a switch for an analog loop of a communications system, comprising: a port intended for connection to a type of terminal equipment, said type of terminal equipment comprising voice call terminal equipment or non-voice call terminal equipment, a demodulator and controller for receiving a call-type signal modulated on said analog loop, demodulating said analog signal and for, if said port is connected to said loop, disconnecting said port from said loop if said call-type signal indicates a type of call not compatible with the type of terminal equipment intended for connection to said port.

According to a further aspect of this invention, there is provided a loop driver for a public switched telephone network (PSTN), comprising:

- a normally closed switch for interposing between a PSTN and an analog loop;
- a controller for opening said switch upon sensing a ringing cadence, determining a type of call based on said ringing cadence, passing a call-type indication to said analog loop, and closing said switch, According to another aspect of this invention, there is provided a driver for driving an analog loop and telephony equipment interconnected with said analog loop, said driver comprising:

- a modulator for modulating a signal indicative of a type of call received at said analog loop driver, and distinct from a ring signal, on an analog loop interconnected with said analog loop driver, while any telephony equipment device interconnected with said analog loop is on-hook.

BRIEF DESCRIPTION OF THE DRAWINGS

In the drawings which illustrate preferred embodiments of the invention,

FIG. 1 is a schematic view of a GSM for use with the subject invention;

FIG. 2 is a schematic view detailing portions of the GSM of FIG. 1;

FIG. 3 is a schematic view detailing a portion of FIG. 2;

FIG. 4 is a schematic view detailing portions of a GSM made in accordance with another aspect of this invention; and FIG. 5 is a schematic view detailing a portion of an analog PSTN made in accordance with another aspect of this invention.

DETAILED DESCRIPTION OF THE PREFERRED EMBODIMENTS

Turning to FIG. 1, a global system for mobile communications (GSM) 10 for use with the subject invention comprises a mobile switching centre (MSC) 12 connected on lines 14*a*, 14*b*, 14*c* to a plurality of base station subsystems (BSSs) 16*a*, 16*b*, and 16*c*, respectively. Each BSS has an antenna 20*a*, 20*b*, 20*c*, respectively, for communicating with any of a plurality of subscriber stations (SSs) associated therewith. More particularly, SSs 22*a*, 24*a*, and 26*a* (SS 26*a* being a mobile phone) are associated with BSS 16*a*, SSs 28*b* and 30*b* are associated with BSS 16*b*, and SSs 32*c*, 34*c*, and 36*c* are associated with BSS 16*c*. The MSC is also connected to the public switched telephone network (PSTN) 42 on trunks 40 and a wire line integrated services digital network (ISDN) 44 on trunks 46.

FIG. 2 details an SS. Turning to FIG. 2, the subscriber station comprises a subscriber unit (SU) 50 comprising a GSM radio module (GRM) 52 having an antenna 54 for the subscriber station, a controller 56, a ring generator 58, a modulator 60, and a line interface 62. Each of the controller, modulator and ring generator input to the line interface; the line interface is connected to an analog loop 70. The SU acts as a loop driver for the analog loop. Several switches 66*a*, 66b, 66c are connected to the loop 70. Each switch has an output port 76a, 76b, 76c which is intended for connection to one of voice terminal equipment, data terminal equipment, or fax terminal equipment. As seen in FIG. 2, telephone 64 is connected to output port 76a of switch 66a, personal computer (PC) modem 68 of PC 74 is connected to port 76b of switch 66b and fax machine 72 is connected to port 76c of switch 66c. As will be appreciated by those skilled in the art, typically, a single subscriber unit may be present in a home and numerous pieces of terminal equipment may be linked to it on an analog loop (also known as a shared two-wire line) via standard telephone jacks. The line interface 62 operates in a conventional fashion by, for example, supplying loop current and detecting whether any terminal equipment connected to the loop is off-hook.

Figure 3:
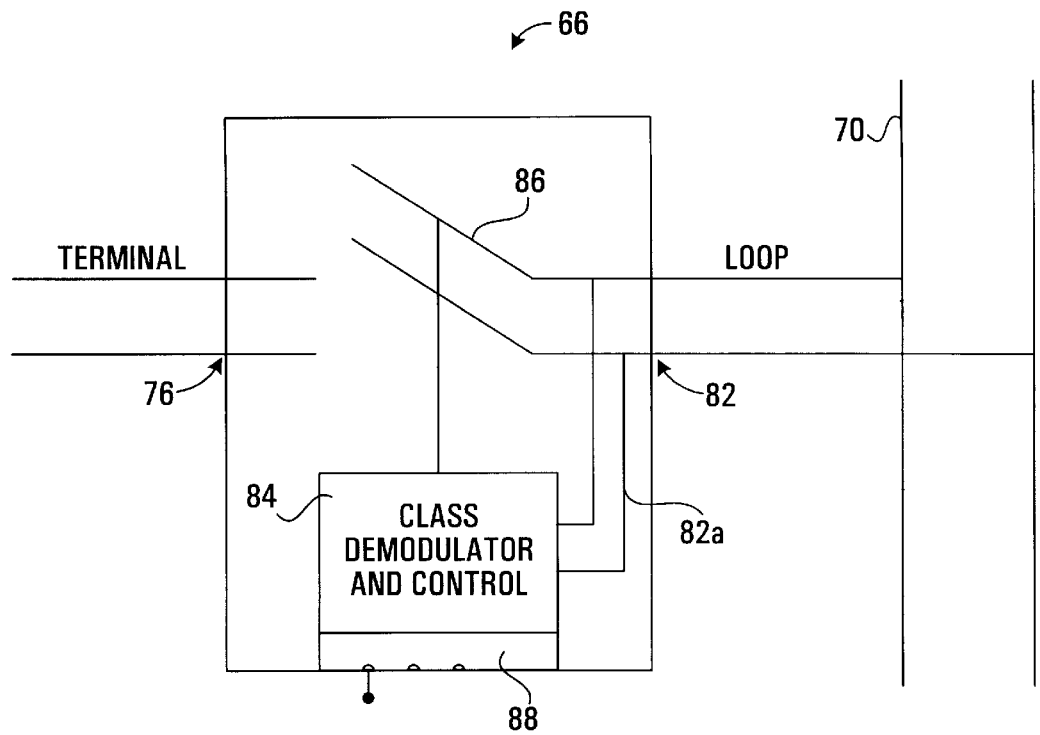

Turning to FIG. 3 which details a switch 66, the switch has input lines 82 for connecting the switch to the analog loop 70. Internally, the switch has a controller 84 operatively coupled to switching blades 86. The controller is input from a branch 82a of the input lines and from a three-position user selector 88. The controller incorporates a demodulator. A user may set the user selector 88 to "voice", "data", or "fax" to indicate a "type" for output port 76 of switch 66. The switch controller 84 normally maintains the switch blades in a closed position connecting the output port to the loop so that a piece of terminal equipment attached to the port 76 may access the loop to place an outgoing call. However, as explained more fully hereinafter, whenever a call-type signal arrives on the loop which indicates a type of call which does not match the type selected for the output port 76, the controller disconnects the output port from the loop until the ensuing ringing signal ceases. The user is expected to select a "type" for the output port 76 which matches the type of terminal equipment attached to the port. Thus, for the SS illustrated in FIG. 2, the user should pre-set the selector 88 of switch 66a to configure port 76a as a "voice" port, the selector of switch 66b to configure port 76b as a "data" port and the selector of switch 66c to configure port 76c as a "fax" port.

Figure 1:
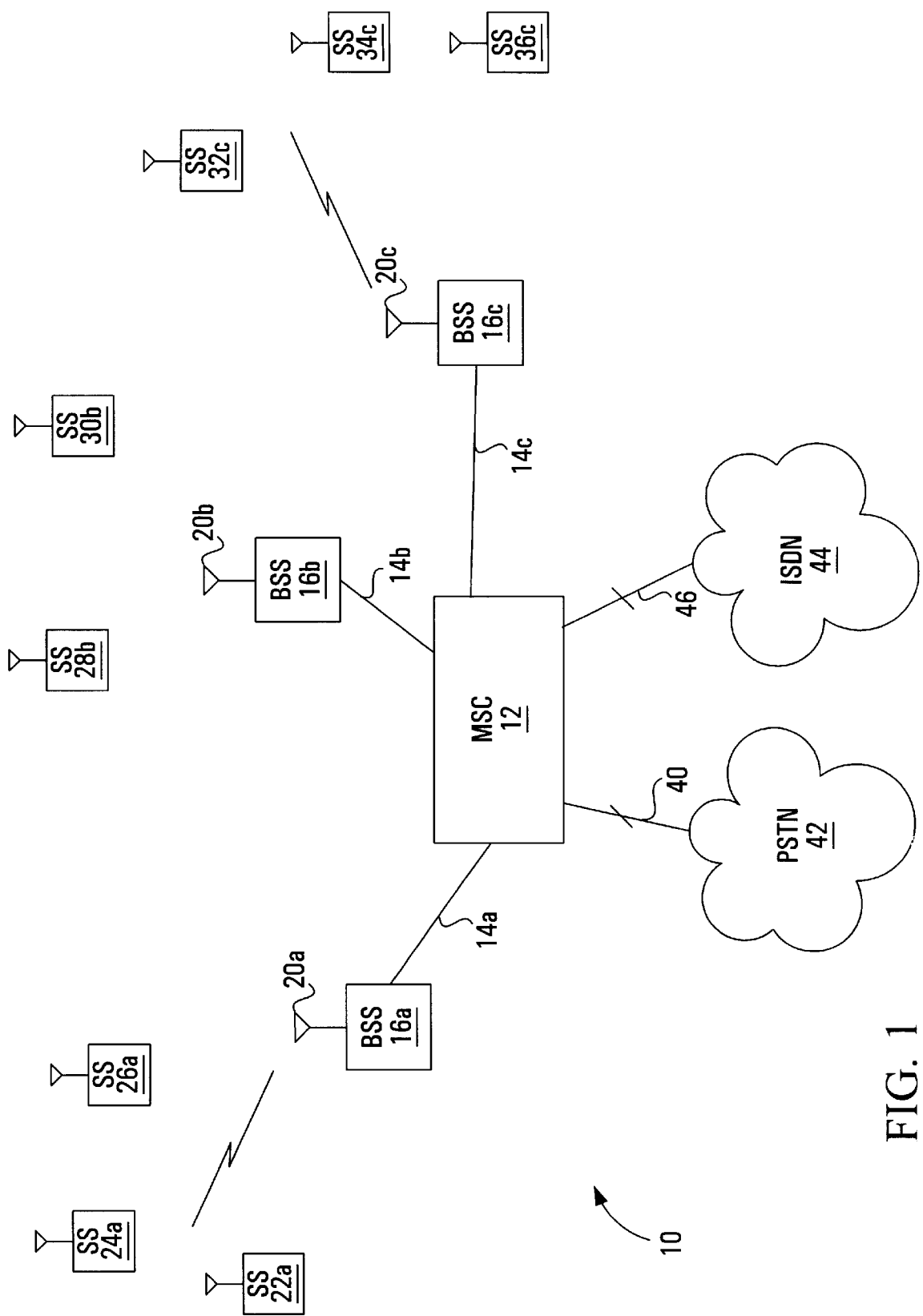

Considering FIG. 1, if a user at SS 22a wishes to communicate with SS 34c, the user may key in the DN for SS 34c. Additionally, the user may key in the type of service requested, such as fax service. As will be appreciated by those skilled in the art, in a GSM different channels are used for each of fax, data, and voice communications. One known technique for indicating a type of service is to dial a prefix in advance of the DN. For example, "*9" dialled in advance of the DN may indicate a fax call, "*8", a data call, and no prefix, a voice call. A wireless link would then be set up between SS 22a and BSS 16a and the SU 50 of SS 22a would pass the indication of a called subscriber station and the indication of a type-of-call to BSS 16a. The BSS 16a passes this information on to MSC 12 over line 14a. On receipt of this information, the MSC 12 runs the procedure needed for call establishment to BSS 16c with which SS 34c is associated and then constructs and sends an out-of-band setup message which is a translation of the service requests (namely the DN for SS 34c and the type-of-call). The MSC starts establishment through the network and sends a "call proceeding" message back to SS 22a. Once BSS 16c has established a radio link with SS 34c, the BSS passes the out-of-band setup message to SS 34c and the MSC receives back from BSS 16c a report indicating, for example, that SS 34c has acknowledged receipt of the set-up message. The MSC responds by passing this information back to BSS 16a which, in turn, returns the information to SS 22a. If the call is accepted at SS 34c, then an "answering" message is received by the MSC. The MSC responds by passing a "connected" message to SS 22a via BSS 16a. Once the "connected" message is received by SS 22a, it connects the call through by completing the circuit transmission path.

The out-of-band setup message which indicates the type-of-call is called a bearer capability information element (BCIE); depending upon the network, the BCIE may be generated by SS 22a, BSS 16a, or MSC 12.

Turning to FIG. 2, when an incoming call is detected at SU 50, the controller 56 of the SU receives the BCIE. The controller determines the type-of-call from the BCIE. From this determination, the controller 56 constructs a call-type indication which it passes to the modulator 60. The modulator constructs a signal modulated with the call-type indication for transmission on the analog loop through line interface 62. For example, if the type-of-call indicated were a fax call, then a particular signal indicative of fax calls would be constructed by the modulator. Many suitable modulation techniques exist, however, conveniently, the modulator 60 may be the same kind used in a PSTN for CLASS$^{sm}$ signalling to transmit a calling line identification (CLID) on an analog loop. After transmission of the call-type signal, the controller prompts the ring generator to send a ringing signal through the line interface to the analog loop 70.

Turning to FIG. 3, when the call-type signal reaches a switch 66, it enters the switch controller 84 and is demodulated by the demodulator of the controller. The controller uses the demodulated call-type indication to position switch blades 86. More particularly, if the call-type indication indicates a fax call and the "type" set for output port 76 is "fax" then the switch blades are left in their default closed position connecting the port to the analog loop. On the other hand, if the call-type indication indicates a voice call or a data call, and the "type" set for the output port 76 is "fax", then the controller acts to disconnect the output port 76 from the analog loop 70. The switch controller 84 maintains the disconnection during the period of time the ensuing ringing signal appears on the analog loop and reverts to the default position after the ringing signal ceases. A similar operation occurs if the "type" set for output port 76 is "voice" or "data": the controller 84 will leave the switch blades 86 in their closed position only if the call-type matches the type set for the output port.

Returning to FIG. 2, if a call-type signal on the analog loop indicated a fax call, the controller 84 of switch 66a would disconnect port 76a from the analog loop. This would disconnect the telephone 64 attached to the switch from the loop. Consequently, the telephone would not respond to the ensuing ringing signal. After the ringing signal ceased, the switch 66a would revert to its default position, connecting the port 76a to the analog loop. Similarly, switch 66b would, responsive to the call-type signal, disconnect port 76b from the analog loop. Thus, the PC 74 would also be disconnected from the analog loop during the pendency of the ringing signal which followed the call-type indication. On the other hand, on receiving a call-type indication indicating a fax call, the switch 66c would leave its output port 76c connected to the analog loop. Consequently, the ensuing ringing signal would be received at the fax machine 72 attached to the fax port of the switch. This would normally result in the fax machine going off-hook to answer the call.

Similarly, if a call-type signal is placed on the loop indicating a voice call, the telephone 64 will ring but no ringing signals will be passed to the PC 74 or fax machine 72.

From the foregoing it will be apparent that, assuming a user configures the output port to match the type of terminal equipment attached to the port (i.e., "voice type" where voice terminal equipment is connected to the output port, etc.), terminal equipment incompatible with the type of incoming call will not ring in response to the call. Thus, for example, a user is not prompted to pick-up a telephone when the SU is receiving a ringing signal relating to an incoming fax call nor will a fax machine pick up a voice call. (Indeed, a user may not be disturbed by any kind of ringing if a fax machine is set up for silent ringing.)

If a call was connected to one piece of terminal equipment, a piece of terminal equipment attached to the output port of another switch 66 would be connected in parallel to the loop if it went off-hook. However, this is no different from the operation of a typical PSTN system and is considered of no moment.

Figure 4:
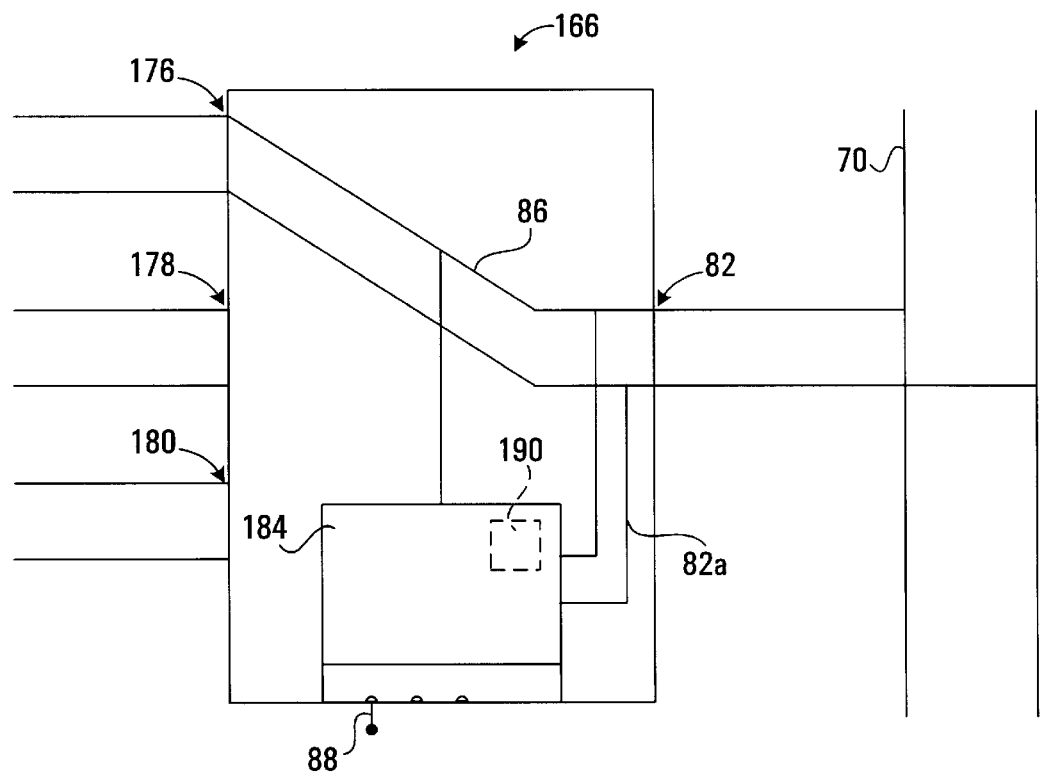

FIG. 4 illustrates another embodiment of a switch for use with the system of FIG. 2. Turning to FIG. 4, wherein like parts to the switch of FIG. 3 have been given like reference numerals, each switch 166 has a controller 184 operatively coupled to switching blades 86 and input from a branch 82a of the input lines 82 and from a three-position user selector 88. The controller incorporates a demodulator 190.

A user may set the user selector to "voice", "data", or "fax" to indicate a desired default port for switch 166. The switch controller is programmed to position the switch blades 86 to connect the default port to the input lines 82 whenever there is no ringing signal. The switch controller can monitor this pre-condition via branch 82a of input lines 82. For example, if, for a particular switch 166, a user has selected "voice" as the default port, then the switch controller will position the switch blades 86 to connect the voice port 176 to line 82, as shown in FIG. 4, whenever the default pre-condition exists. In normal operation, a user would be expected to select as the default port for a switch the port which is connected to a piece of terminal equipment. Thus, with switches 166 used in the SS of FIG. 2, the switch connected to telephone 64 would have its "voice" port connected to the telephone and this port would be selected as the default port, the switch connected to PC 74 would have its "data" port connected and selected, and the switch connected to fax machine 72 would have its "fax" port connected and selected.

When a call-type signal reaches a switch 166, it enters the switch controller 184 and is demodulated by the demodulator of the controller. The controller uses the demodulated call-type indication to position switch blades 86. More particularly, if the call-type indication indicates a fax call, the switch blades are moved to connect the fax port to the analog loop, if the fax port was not already connected (by virtue of being the default port). Similarly, if the call-type indication indicates a voice call, the voice port is connected, and if the call-type indication indicates a data fax call, the data port is connected. The switch controller 84 holds this switch setting during the period of time the ensuing ringing signal appears on the analog loop. After the ringing signal ceases, the switch 166 will revert to its default position.

With the modified switches 166 used in the SS of FIG. 2, if a call-type signal on the analog loop indicated a fax call, the switch connected to telephone 64 would respond by connecting the fax port of the switch to the analog loop. This would disconnect the telephone attached to the switch from the loop. Consequently, the telephone would not respond to the ensuing ringing signal. Further, since the fax port of that switch is not connected to any piece of terminal equipment, the ensuing ringing signal would not input any terminal equipment on the switch. After the ringing signal ceased, the switch would revert to its default position (which would normally be the position connecting the voice port to the analog loop). In this way, only a piece of terminal equipment connected to a fax port of a switch would receive the ringing signal.

From the foregoing it will be apparent that, assuming a user attaches a compatible type of terminal equipment to a port, terminal equipment incompatible with the type of incoming call will not ring in response to the call. If the user makes the "normal" choice for the default port such that the port to which a piece of terminal equipment is attached is the default port, then that piece of terminal equipment will be connected to the analog loop in the absence of any call-type or ringing signal. Thus, the user may place outgoing calls from that piece of terminal equipment without special arrangements.

With certain modifications, switches 166 may be adapted to allow a user to connect three pieces of terminal equipment to a single switch. More particularly, switch controller 184 would need to be programmed such that it would not return to its default position until (i) there is no ringing signal on the loop and (ii) the particular call connected pursuant to the ringing signal had ended. To allow the controller to monitor for this second pre-condition, the controller 56 of the SU 50 may send a CLASS$^{tm}$ signal when a call ceases, which the controller 184 receives on branch 82a of lines 82. Alternatively, controller 184 could monitor the D.C. voltage on the loop 70 via branch 82a as this voltage depends upon whether or not a piece of terminal equipment is off-hook. With these modifications, if the incoming call were a voice call, the telephone attached to the switch 166 would ring, if the call were a data call, the ringing signal would be received by the attached PC, and if the call were a fax call, the signal would be received by the fax machine. The terminal equipment receiving the ringing signal could go off-hook in response to the call and the switch would allow that terminal equipment to remain connected to the loop until the terminal equipment returned to an on-hook condition. Once the answering terminal equipment went on-hook, the switch would return to its default position. If the user wished to place a call from a piece of terminal equipment not connected to the default port, it would be necessary for the user to first change the default port using the user selector so that terminal equipment from which the call was to be placed was connected to the new default port.

In the example of an incoming call described in conjunction with FIG. 1, one SS of the GSM placed a call to another SS of the GSM. If the incoming call instead originated from a wire-line ISDN 44, the situation would be no different. This is because a wire-line ISDN is provisioned with subscriber units each of which is connected to a switch over a wire line; a BCIE is generated in such a network during call set-up. Thus, an incoming call from a wire-line ISDN 44 to MSC 12 may be treated in the same fashion as an incoming call from a BSS 16a, 16b, 16c.

An incoming call from an analog portion of a PSTN presents difficulties as no type-of-call information can be included out-of-band. One solution for allowing analog PSTN calls to the GSM network of the subject invention is to designate different PSTN phone numbers for different types of call to a single SS. Thus, for example, there may be one phone number for fax calls to an SS, one for data calls, and one for voice calls. When MSC 12 receives one of these phone numbers over line 40, it may utilize a look-up table which will translate that phone number to a number indicating the particular SS and a type-of-call indication. With this information, the MSC may generate a standard call setup message to the appropriate BSS.

While lines 14a, 14b, and 14c are indicated as wire lines, it will be recognized that these could be replaced with wireless links. Further, while the call setup message has been described as being generated by the MSC, equally, it could be generated by the calling SS or its associated BSS.

The present invention has been described for use with a GSM. It will he appreciated, however, that it would have equal application to any multi-service wireless or wire-line ISDN which incorporated an analog loop having a loop driver (such as an analog loop adapter). In such networks, the digital hub of the network would generate a type-of-call BCIE which could be used by the terminating equipment to construct a call-type signal, as aforedescribed.

Figure 5:
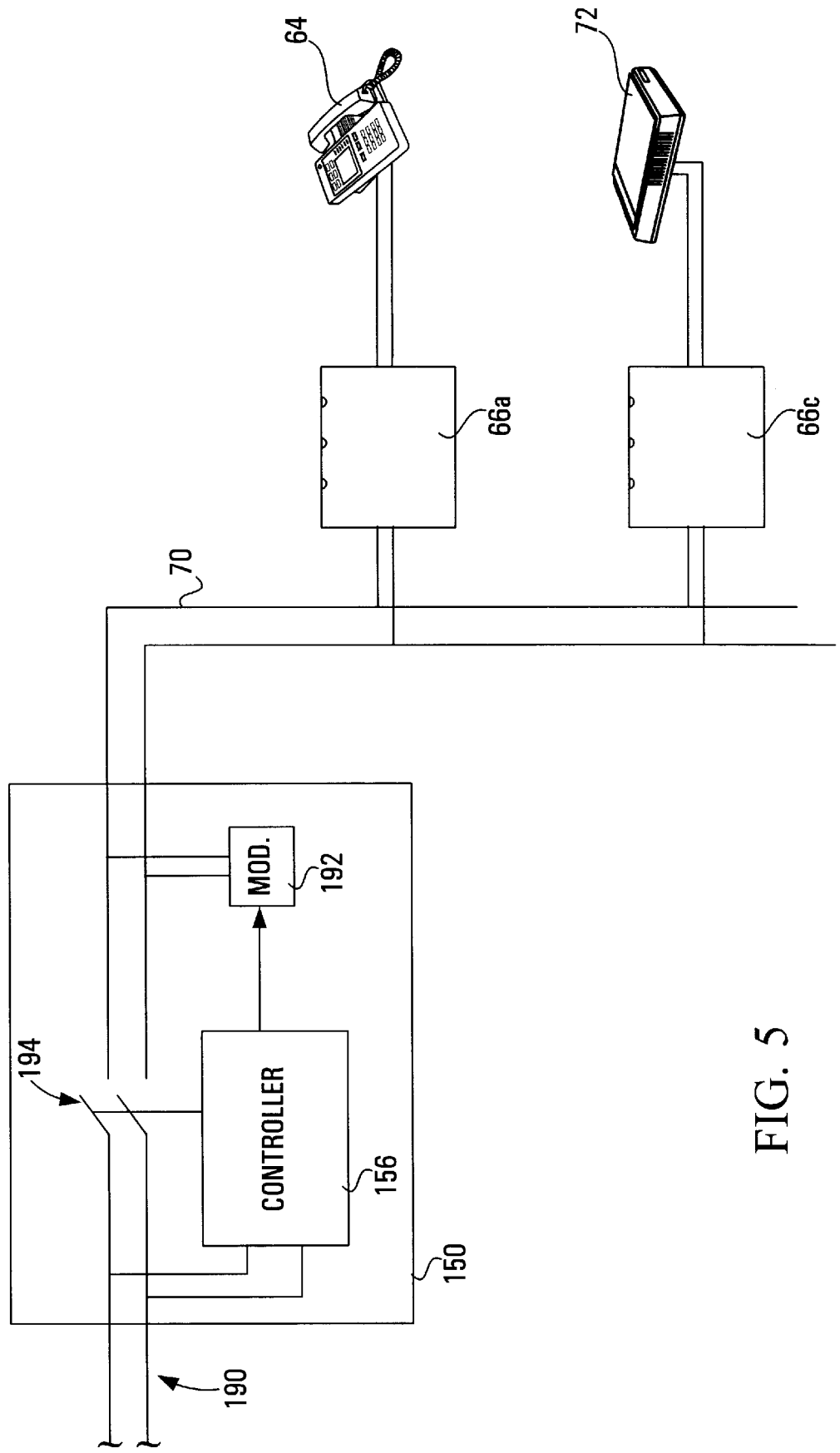

The present invention may also be applied to all analog PSTN which is provisioned with distinctive ringing for different types of calls. FIG. 5 illustrates an embodiment of the present invention applied to such an analog PSTN. Turning to FIG. 5, wherein like parts to the system of figure 2 are given like reference numerals, a loop driver 150 is connected between a PSTN loop 190 and analog loop 70. Switches 66a and 66c are connected to the analog loop 70 with a telephone 64 connected to switch 66a and a fax machine 72 connected to switch 66c. Switch 66a has its output port user configured as a "voice type" port and switch 66c has its output port user configured as a "fax type" port. The loop driver 150 has a switch 194 between the PSTN loop 190 and analog loop 70, a modulator 192 connected to loop 70 and a controller 156. The controller is connected to the PSTN loop 192, a control input of modulator 192, and a control for switch 194.

In the absence of a call, controller 156 maintains switch 194 in a closed condition so that outgoing calls may be placed. When a distinctive ringing cadence reaches the controller from the PSTN loop 190, the controller, upon sensing the ringing signal, opens switch 194. With a standard 20 Hz ringing signal, the controller is able to detect the signal in about one cycle—i.e., about 50 ms—by detecting a positive and negative peak of the signal. Terminal equipment on loop 70 is not expected to respond to a ringing signal of such short duration. The controller then determines the type of call based on the cadence and passes a call-type indication to modulator 192. The modulator sends an indication of the call type down loop 70. In the same manner as described in conjunction with switches 66 of FIG. 2, switches 66 of FIG. 5 respond to the call-type indication to either maintain the connection between the attached piece of terminal equipment and loop 70 or disconnect the piece of terminal equipment and from the loop. After prompting the modulator to send the call-type indication, the controller 156 closes switch 194 allowing the ringing cadences to reach loop 70. Now, only the piece of terminal equipment matching the type of call should be connected to the loop 70 and will respond to the ringing signal. The controller 156 maintains switch 194 closed until sensing another ringing signal after the end of the call. Of course, the system of FIG. 5 would also function with the switches 166 of FIG. 4 in place of the switches 66 of FIG. 3.

Other modifications will be apparent to those skilled in the art and, therefore, the invention is as defined in the claims.

What is claimed is:

1. Apparats for use in a communication system having an analog loop said apparatus comprising:

a loop driver for driving said analog loop, and terminal equipment devices interconnected with said analog loop, said loop driver for receiving an incoming call which incoming call includes an indication indicating whether said incoming call is a voice call or a non-voice call, constructing a call-type signal based on said indication, transmitting said call-type signal on said analog loop and, thereafter, placing a ringing signal distinct from said call-type signal on said analog loop;

at least one switch for connection to said analog loop, said at least one switch having a port for connection to a type of terminal equipment, said type of terminal equipment comprising voice call terminal equipment or non-voice call terminal equipment, said switch for receiving said call-type signal on said analog loop and for disconnecting said port from said loop if said call-type signal indicates a type of call not compatible with said type of terminal equipment.

2. The apparatus of claim 1 wherein said at least one switch has a user input for selecting said type of terminal equipment for connection to said port.

3. The apparatus of claim 2 wherein said at least one switch is for, after disconnecting said port from said loop, connecting said port to said analog loop after a ringing signal which follows a call-type signal indicating a type of call not compatible with said type of terminal equipment ceases.

4. The apparatus of claim 1 wherein said switch is also for, if said port is disconnected from said loop, connecting said port to said loop if said call-type signal indicates a call which is compatible with said type of terminal equipment.

5. The apparatus of claim 4 wherein said at least one switch has three ports, one for connection to voice terminal equipment, one for connection to data terminal equipment, and one for connection to fax terminal equipment.

6. The apparatus of claim 5 wherein said at least one switch has a user input for selecting one of said ports for connection to said analog loop in the absence of any ringing signal or call-type signal on said analog loop.

7. The apparatus of claim 1 wherein said loop driver comprises a modulator for modulating said call-type signal onto said analog loop.

8. The apparatus of claim 7 wherein said switch comprises a demodulator and controller for demodulating said call-type signal received on said analog loop and for selectively disconnecting said at least one port in response to said demodulated signal.

9. Apparatus for use in a GSM system having a local analog loop comprising:

a subscriber unit for driving said local analog loop, and terminal equipment devices interconnected with said local analog loop, said subscriber unit for receiving an out-of-band indication indicating whether any incoming call is a voice or a non-voice call, constructing a call-type signal based on said indication, transmitting said call-type signal on said analog loop and, thereafter, generating a ringing signal distinct from said call-type signal on said analog loop;

at least one switch for coupling to said analog loop, said at least one switch having a port for connection to one type of terminal equipment, said one type of terminal equipment comprising voice call terminal equipment or non-voice call terminal equipment, said switch for receiving said call-type signal on said analog loop and for disconnecting said port from said loop if said call-type signal indicates a type of call not compatible with said one type of terminal equipment.

10. A method for use in a communication system having an analog loop driven by a loop driver, comprising:

receiving at said loop driver an incoming call which incoming call includes an indication indicating whether said incoming call is a voice call or a non-voice call;

placing a singing signal on said analog loop;

based on said indication, transmitting a call-type signal, distinct from said ringing signal; on said analog loop;

responsive to said call-type signal, disconnecting any port from said analog loop which is not intended for attachment wit terminal equipment compatible with a call-type indicated by said call-type signal.

11. The method of claim 10 including the step of, responsive to said call-type signal, connecting said port to said analog loop if said port is intended for attachment to terminal equipment of a type compatible with a call-type indicated by said call-type signal prior to placing said ringing signal on said analog loop, if said port is disconnected from said analog loop.

12. The method of claim 11 wherein said signal indicates whether said incoming call is a voice, data, or fax call.

13. A switch for an analog loop of a communication system, comprising:

a port intended for connection to a type of terminal equipment, said type of terminal equipment comprising voice call terminal equipment or non-voice call terminal equipment;

a demodulator and controller for receiving a call-type signal modulated on said analog loop and associated with a call, demodulating said call-type signal, and for, if said port is connected to said loop, disconnecting said port from said loop if said call-type signal indicates a type of call not compatible with the type of terminal equipment intended for connection to said port, and ensuring a connection between said analog loop and said port, if said call-type signal indicates a type of call compatible with the type of terminal equipment intended for connection to said port, thereby passing said call and a ring signal associated with said call distinct from said call-type signal to said port, and any interconnected terminal equipment.

14. A loop driver for a public switched telephone network (PSTN), comprising:

a normally closed switch for interposing between a PSTN and an analog loop;

a controller for opening said switch upon sensing a ringing cadence, determining a type of call based on said ringing cadence, passing a call-type indication to said analog loop, and closing said switch.

15. A method of driving an analog subscriber loop, said analog subscriber loop for driving terminal equipment devices interconnected with said analog subscriber loop, said method comprising:

a) receiving a call including an indicator of a call type at an analog subscriber loop driver;

b) placing a ring signal on said analog subscriber loop;

c) modulating a signal indicative of said call type and distinct from said ring signal, on said analog subscriber loop, while all terminal equipment devices interconnected with said analog loop are on-hook.

16. A driver for driving an analog loop and terminal equipment interconnected with said analog loop, said driver comprising:

a receiver for receiving a call including an indicator of a call type;

a ring generator for placing a ring signal on said analog loop;

a modulator for modulating a signal indicative of a type of call received at said analog loop driver, and distinct from a ring signal, on an analog loop interconnected with said analog loop driver, while all terminal equipment devices interconnected with said analog loop are on-hook.

17. The driver of claim 16, further comprising:

a controller in communication with said modulator, said controller operable to sense a ringing cadence received from a telephone network interconnected with said driver, and pass a signal to said modulator corresponding to said ringing cadence, and wherein said signal indicative of a type of call, is formed based on said signal passed by said controller.

18. The driver of claim 17, further comprising:

a switch disconnecting any subscriber loop and hence any terminal equipment device interconnected with said subscriber loop from said telephone network, in response to receiving a ring signal from said telephone network, said switch further operable to connect said loop to said telephone network, after said modulator has modulated said signal indicative of a type of call on said loop.

19. A telephony interface, for connection to an analog subscriber loop and a telephony equipment device, said analog subscriber loop for driving terminal equipment devices interconnected with said analog loop, said interface comprising:

a demodulator for receiving a call-type signal associated with an incoming call and indicative of a call type of said incoming call, modulated on an analog subscriber loop connected to said interface, said call-type signal distinct from a ring signal on said analog subscriber loop and received prior to answering said incoming call;

a switch in communication with said demodulator, and connecting said analog subscriber loop and a telephony equipment device interconnected with said interface, when said call-type signal indicates a pre-selected call type compatible with said terminal equipment device interconnected with said switch.

20. The interface of claim 19, further comprising a user input for selecting a call-type compatible with a terminal equipment device interconnected with said switch.

21. The interface of claim 19 wherein said switch has three ports, one for connection to voice terminal equipment, one for connection to data terminal equipment, and one for connection to fax terminal equipment, and wherein said switch connects a one of said ports compatible with a call type indicated by said call type signal.

22. The interface of claim 21, further comprising a user input for selecting one of said ports for connection to said analog loop in the absence of a call-type signal on said analog loop.

23. The interface of claim 19, wherein said switch disconnects said analog subscriber loop from said terminal equipment device interconnected with said interface, when said call-type signal indicates a call type incompatible with said terminal equipment device interconnected with said interface.

24. A method of interfacing voice or non-voice terminal equipment with an analog loop, said method comprising:

receiving a call-type signal associated with a call on said analog loop, said call-type signal distinct from a ring signal on said analog loop;

demodulating said call-type signal;

responsive to said call-type signal indicating a call-type compatible with said terminal equipment, ensuring a connection between said analog loop and said terminal equipment to pass a ring signal distinct from said call-type signal, and said call to said terminal equipment;

responsive to said call-type signal indicating a call-type incompatible with said terminal equipment, ensuing a disconnection between said analog loop and said terminal equipment.

25. Apparatus for use in a communications system having an analog loop, said apparatus comprising;

a loop driver for driving said analog loop, and telephony equipment devices interconnected with said analog loop, said loop driver operable to:

receive an incoming call including an indication indicating whether said incoming call is a voice call or a non-voice call;

place a ringing signal on said analog loop;

construct a call-type signal based on said indication, and distinct from said ringing signal; and transmit said call-type signal on said analog loop said apparatus further comprising at least one switch for connection to said analog loop, said at least one switch having a port for connection to a type of terminal equipment, said type of terminal equipment comprising voice call terminal equipment or non-voice call terminal equipment, said switch for receiving a call-type signal on said analog loop and for disconnecting said port from said loop if said call-type signal indicates a type of call not compatible with said type of terminal equipment.

26. The apparatus of clam 25, wherein said loop driver is further operable to transmit said call-type signal before placing said ringing signal on said analog loop.

* * * * *